United States Patent [19]

Rosenberg

[11] Patent Number: 4,919,163
[45] Date of Patent: Apr. 24, 1990

[54] DEVICE AND METHOD FOR FLUSHING FLUID LINES

[76] Inventor: Peretz Rosenberg, Beit Shaareem, Israel

[21] Appl. No.: 411,985

[22] Filed: Sep. 25, 1989

[30] Foreign Application Priority Data

Jan. 10, 1989 [IL] Israel .................................. 88916

[51] Int. Cl.⁵ .............................................. F16K 51/00
[52] U.S. Cl. ....................................... 137/15; 137/102; 137/238
[58] Field of Search ................ 137/15, 102, 107, 238, 137/517; 239/113; 251/16

[56] References Cited

U.S. PATENT DOCUMENTS

| | | | |
|---|---|---|---|
| 4,022,244 | 5/1977 | Oman | 137/517 |
| 4,393,891 | 7/1983 | Snoek | 137/238 |
| 4,427,174 | 1/1984 | Mehoudar | 251/16 |

Primary Examiner—Robert G. Nilson
Attorney, Agent, or Firm—Benjamin J. Barish

[57] ABSTRACT

A device for flushing out contaminants from a line section conveying a pressurized fluid, includes a container for receiving the contaminants, and a valve assembly connecting the container to the end of the line section to be flushed. The valve assembly is effective when the line section is depressurized to connect the interior of the container to the interior of the line section so that the container receives the contaminants and pressure in the line section immediately upon the application of pressurized fluid to the line section, and is effective immediately after pressurized fluid has been applied to the line section, to disconnect the interior of the container from the line section and to connect the container to the atmosphere to thereby discharge its contents to the atmosphere.

18 Claims, 1 Drawing Sheet

DEVICE AND METHOD FOR FLUSHING FLUID LINES

FIELD AND BACKGROUND OF THE INVENTION

The invention relates to a device and method for flushing out contaminants from a fluid line. The invention is particularly applicable for flushing out a water supply line, such as used in water irrigation systems, and is therefore described below with respect to this application, but it will be appreciated that the invention could advantageously be used in other applications.

It has been found desirable to flush out water irrigation lines at the start and finish of each irrigation cycle in order to remove sedimentation and other contaminants accumulating in the line between irrigation cycles when no water is flowing through the line. One technique presently used includes a line flushing valve which is normally open to discharge the contaminants when the pressurized water is first applied to the line to flush out the contaminants, and then automatically closes after a predetermined time delay determined by a labyrinth through which the water flows. However, in such a system, it frequently happens that the closing of the valve is delayed, or even prevented, by clogging of the valve, thereby not only producing a large wastage of water, but also requiring manual intervention to close the valve and to clean it of the clogging particles.

OBJECTS AND SUMMARY OF THE INVENTION

An object of the present invention is to provide a device, and also a method, for flushing fluid lines and having advantages particularly in the above respects.

According to the present invention, there is provided a device for flushing out contaminants from a line section conveying a pressurized fluid, comprising a container for receiving the contaminants, and a valve assembly connecting the container to the end of the line section to be flushed. The valve assembly comprises means effective when the line section is depressurized to connect the interior of the container to the interior of the line section so that the container receives the contaminents and pressure in the line section immediately upon the application of pressurized fluid to the line section; and means automatically effective immediately after pressurized fluid has been applied to the line section, to disconnect the interior of the container from the line section and to connect the container to the atmosphere to thereby discharge its contents to the atmosphere.

The invention also provides a method for flushing out contaminants from a section of a line conveying a pressurized fluid, comprising: attaching a container to the end of the line section via a valve assembly which, when the line section is depressurized, connects the interior of the container to the interior of the line section, and when the line section is pressurized, disconnects the interior of the container from the end of the line section and connects the interior of the container to the atmosphere; and applying pressurized fluid to the line section first to cause the contaminants to be received within the container and the interior of the container to be pressurized, and then to disconnect the interior of the container from the line section and to connect it to the atmosphere, whereby the contents of the container are flushed out to the atmosphere.

It will thus be seen that the device and method of the present invention differ in a very important respect from the previously known line flushing valve briefly described above. Thus, whereas in the previously known line flushing valve, the line is initially open to discharge the contaminants when pressurized fluid is first applied and then closes after a predetermined time interval, in the device and method of the present invention the line is always closed to the atmosphere. That is, the line is normally connected directly to the interior of the container to transfer the contaminants to the container and to pressurize the container immediately upon the initial application of pressurized fluid to the line; and after the pressure has built up, the container is automatically disconnected from the line and is connected to the atmosphere so that the buildup of pressure within the container effectively discharges the contaminants to the atmosphere.

The novel arrangement thus more positively assures that substantial amounts of water will not be wasted through a clogged valve. Moreover, it substantially reduces the possibility of clogging since all the passages may be very large, and thereby obviates the need to periodically clean the valve assembly. Further, the line can be flushed at any desired time by merely reducing the pressure, to connect the interior of the container to the line, and then increasing the pressure to disconnect the interior of the container from the line and to connect it to the atmosphere, so that the dirt accumulating in the container is discharged to the atmosphere by the pressure within the container.

According to another important feature of the invention, the valve assembly includes means effective, upon the initial increase in pressure of the fluid in the line section, to apply an initial force to the valve assembly starting its actuation to disconnect the interior of the container from the line section, and upon a further increase in the pressure of the fluid in the line section, to apply an increased force to the valve assembly completing its actuation to disconnect the interior of the container from the line section.

This feature more possibly assures proper operation of the valve assembly first to carry the contaminants to the container when the pressure is first applied, and then to discharge the contaminants from the container as the pressure builds up to line pressure. This increased force applied to the valve assembly also more positively assures that the line section will be closed to the atmosphere during the normal irrigation cycle.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

The line flushing device illustrated in FIGS. 1 and 2a-2c, and therein generally designated 2, is applied to the end of a line 4, such as a lateral in a water irrigation system, in order to flush out sedimentation and other contaminants accumulating in the line which might tend to clog the water irrigation devices, particularly drippers, used in the irrigation system.

Flushing device 2 comprises a container 6 for accumulating the contaminants, and a valve assembly 8 connecting the line 4 to container 6. Briefly, valve assembly 8 is effective, when the line 4 is depressurized, to connect the interior of container 6 to the line section and thereby to receive the contaminants when the pressure is first applied, at which time the container also becomes pressurized. However, immediately after the line has been pressurized, valve assembly 8 disconnects the interior of the container from the line and connects it to the atmosphere, such that the pressure within the container now discharges its contents including the contaminants to the atmosphere.

Figure 2A:
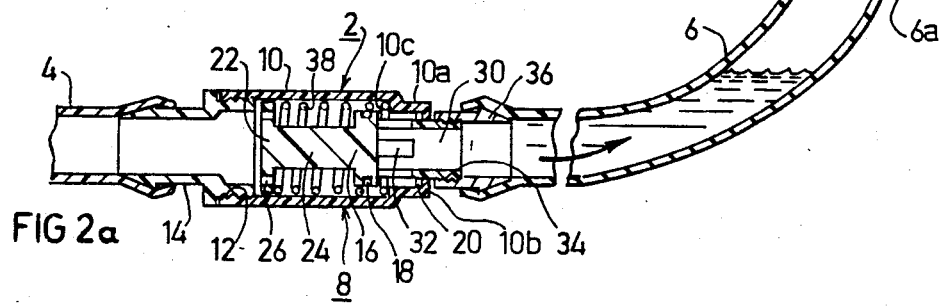
FIGS. 2a, 2b and 2c illustrate the different stages in the operation of the line flushing device of FIG. 1.
Figure 2B:
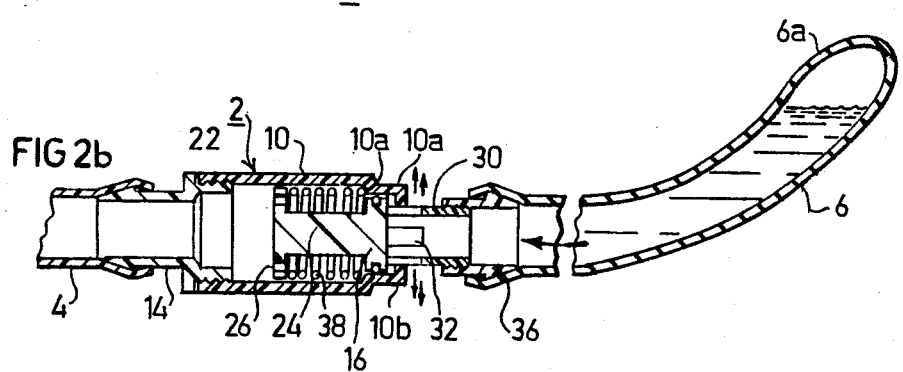
Figure 2C:
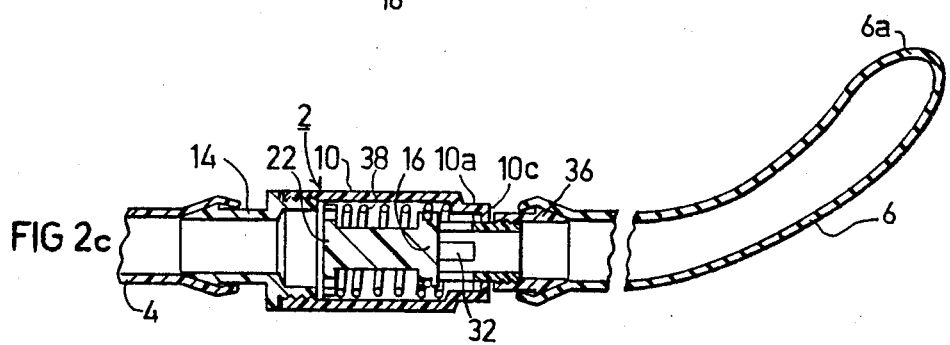

The structure of valve assembly 8 is more particularly illustrated in FIGS. 2a14 2c. FIG. 2a illustrates the condition of the valve assembly before the pressure is applied at the beginning of an irrigation cycle; FIG. 2b illustrates its condition after the pressure has been applied during the irrigation cycle; and FIG. 2c illustrates its condition after the pressure has been reduced or removed at the end of the irrigation cycle.

Valve assembly 8 comprises a cylindrical housing 10 formed with internal threads 12 for receiving a connector 14 attached to one end of the housing to connect it to the line 4. The opposite end of housing 10 is reduced in diameter to form a cylindrical section 10a, which section terminates in an inwardly-directed annular flange 10b. A piston 16 is disposed within housing 10 and has an outer diameter which is equal to the inner diameter of the cylindrical section 10a of the housing. A sealing ring 18 is seated within an annular recess formed in piston 16 to sealingly engage the inner face of the housing cylindrical section 10a in one position of the piston. A second sealing ring 20 is received on the inner face of the annular flange 10b to be engageable by piston 16 in the end position of the piston within the cylindrical section 10a of the housing.

Valve assembly 8 further includes a guiding disc 22 secured to piston 16 by means of a solid stem 24. Guiding disc 22 has an outer diameter substantially equal to the inner diameter of housing 10 so as to guide the movement of piston 16 within the housing, and is formed with a plurality of peripheral openings 26 outwardly of stem 24 to permit the water to pass into the housing from line 4.

Valve assembly 8 further includes a hollow stem 30 fixed to piston 16 at the side opposite to that of guiding disc 22. Hollow stem 30 passes through the opening defined by the inner face of annular flange 10b of the housing, and has an outer diameter equal to the inner diameter of that flange. The inner end of the hollow stem 30 is formed with a plurality of large openings 32 around it periphery. The outer end of the hollow stem is externally threaded as shown at 34 and receives a connector 36 for attaching the stem to container 6. Guiding disc 22, solid stem 24, piston 16 and hollow stem 30 may all be formed as a single integral unit, e.g., of plastic.

Valve assembly 8 further includes a coiled spring 38 interposed between guiding disc 22 and an annular shoulder 10c formed at the juncture between the valve housing 10 and its reduced-diameter cylindrical section 10a. Coiled spring 38 thus biasses piston 16, as well as hollow stem 30 fixed to the piston, inwardly of the valve housing 10.

Container 6 is illustrated in the drawings as being a simple tube closed at its end 6a opposite to the end connected to the hollow stem 30 by connector 36. Container 6, however, could take many other forms. For example, it could be a bottle, or even a vertically-extending tube open to the atmosphere at its opposite end but long enough so as to retain a head of fluid within it which closes that end to the atmosphere. The end 6a of container 6, however, should be at an elevation above that of the valve assembly 8 so that any sedimentation or other contaminants received within the container will settle at the low end of the container adjacent to the hollow stem 30.

The device illustrated in the drawings operates as follows:

FIG. 2a illustrates the initial condition of the device, e.g., before the start of an irrigation cycle, when the fluid in line 4 is not pressurized. In this condition, coiled spring 38 moves piston 16 to the position illustrated in FIG. 2a, wherein it is inwardly of cylindrical section 10a of the housing. Accordingly, communication is established between the interior of line 4 and the interior of container 6 via openings 26 in guiding disc 22, and openings 32 in hollow stem 30. However, the line itself is closed by container 6.

As pressure is first applied to line 4, piston 16 will start to move towards cylindrical section 10a of the housing against the force of spring 38. Before it reaches section 10a, the inner diameter of the annular flange 10b defines the effective area of the force applied by the inlet pressure, since this is the area of the force subjected to the atmosphere and opposing the force applied by spring 38. As the pressure increases, piston 16 moves towards cylindrical section 10a of the housing, and as soon as it enters that cylindrical section, the inner diameter of section 10a now becomes the effective area of the force applied to piston 16 by the inlet pressure. Accordingly, piston 16 will now move quickly towards sealing ring 20 towards annular flange 20b of the housing until it firmly abuts against sealing ring 20.

As one example, the diameter of the inner face of flange 10b may be 1.5 cm, and that of the inner face of cylinder 10 may be 2.0 cm, whereby the closing force will be approximately doubled when piston 16 reaches cylindrical section 10a. This increased closing force also more positively assures the closing of this end of the line to the atmosphere during a normal irrigation cycle.

It will be appreciate that as soon as pressurized water is applied to line 4, and before piston 16 moves into engagement with the inner face of cylindrical section 10a of the housing, the communication between the interior of line 4 and the interior of container 6 causes an initial flow of water into container 6. This initial flow of the water flushes into container 6 the contaminants which had settled in the line between irrigation cycles. In addition, it pressurizes the interior of container 6.

As soon as piston 16 engages the inner face of cylindrical section 10a of the housing, this communication between the interior of line 4 and the interior of container 6 is terminated. The increase in the effective area of the force applied to piston 16 at this instant, as described above, causes the piston to move quickly against sealing ring 20. This quick movement of the piston moves its hollow stem, particularly its end containing the passageways 32, outwardly of annular flange 10b of housing 10 so as to be exposed to the atmosphere, whereupon the pressure within container 6 discharges to the atmosphere the water and contaminants previously received within the container, as shown in FIG. 2b.

The valve assembly will be retained in the position illustrated in FIG. 2b until the pressure of the line is removed or decreased to the point where coiled spring 38 will again urge piston 16 to its normal position as illustrated in FIG. 2c.

Thus, at the start of an irrigation cycle when line 4 is first pressurized, the contaminants within the line will be forced into container 6, and as soon as the line pressure builds up to a predetermined value, the contents of container 6 will be automatically discharged to the atmosphere via openings 32. It will be appreciated that under all conditions, the interior of line 4 is never open to the atmosphere, thereby reducing or eliminating the possibility of substantial water wastage by a stuck valve. It will also be appreciated that the openings 26 and 32 may be very large, thereby substantially reducing the possibility of clogging, as well as the need to periodically clean the valve assembly.

Figure 1:
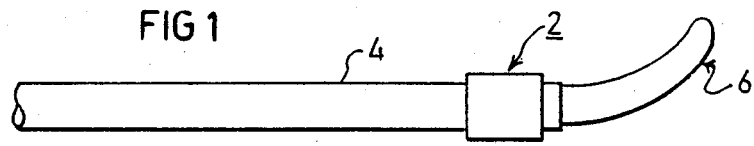
FIG. 1 illustrates one form of line flushing device constructed in accordance with the present invention applied to the end of a line section.
Figure 3:
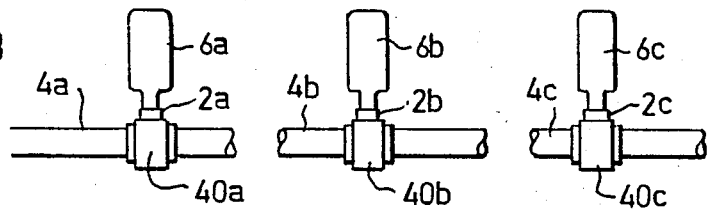
FIG. 3 illustrates a plurality of line flushing devices applied at intermediate points along a line in order to flush out contaminants from the respective sections of the line.

FIG. 1 illustrates the flushing device applied to the end of a line section 4. It could also be applied to any intermediate point of a line. Thus, FIG. 3 illustrates a plurality of such devices 2a, 2b, 2c, applied to the ends of line sections 4a, 4b, 4c, each device being attached to the end of its respective section by a T-fitting 40a, 40b, 40c, and the container 6a, 6b, 6c of each section being in the form of a bottle. Thus, each of the flushing devices is effective to flush out the contaminants in its respective section.

The illustrated devices thus automatically flush out contaminants from a line at the beginning of each irrigation cycle. If it is desired to flush out the line during an irrigation cycle, it is only necessary to reduce the pressure in the line and then to increase it again, whereupon the device will automatically flush out the contaminants in the manner described above.

While the invention has been described with respect to flushing out water supply lines, it will be appreciated that it could also be used with other type fluid lines, such as to flush out water accumulating in oil supply lines, or in air supply lines. Many other variations, modifications and applications of the invention will be apparent.

What is claimed is:

1. A device for flushing out contaminants from a line section conveying a pressurized fluid, comprising: a container for receiving the contaminants; and a valve assembly connecting the container to the end of the line section to be flushed; said valve assembly comprising means effective when the line section is depressurized to connect the interior of the container to the interior of the line section so that the container receives the contaminents and pressure in the line section immediately upon the application of pressurized fluid to the line section; and means automatically effective immediately after pressurized fluid has been applied to the line section, to disconnect the interior of the container from the line section and to connect the container to the atmosphere to thereby discharge its contents to the atmosphere.

2. The device according to claim 1, wherein said valve assembly further includes means effective, upon the initial increase in pressure of the fluid in the line section, to apply an initial force to the valve assembly starting its actuation to disconnect the interior of the container from the line section, and upon a further increase in the pressure of the fluid in the line section, to apply an increased force to the valve assembly completing its actuation to disconnect the interior of the container from the line section.

3. The device according to claim 1, wherein said valve assembly comprises: a valve housing; a first connector at one end of the housing to connect it to the end of the line section; a second connector at the opposite end of the housing to connect it to the container; a valve opening through said opposite end of the connector communicating with the interior of said container; a valve member movable within said housing to either an open position or to a closed position with respect to said valve opening; a hollow stem formed with a passageway extending through a wall thereof; said hollow stem being fixed to said valve member and movable therewith such that its passageway is disposed within said housing when the valve member is in its open position, and is disposed externally of the housing when the valve member is in its closed position; and a spring normally urging said valve member to its open position.

4. The device according to claim 3, wherein said valve opening is formed in a cylindrical end of the housing, and said valve member is a piston of the same outer diameter as the inner diameter of said cylindrical opening, and is movable into and out of said cylindrical opening.

5. The device according to claim 4, wherein said cylindrical end of the housing is formed with an annular flange of a smaller inner diameter than the outer diameter of the piston and engageable by the piston, whereby the inner diameter of the annular flange defines the effective area of the force initially applied by the pressure of the fluid to initially move the piston towards its closed position, until the piston engages said cylindrical end of the housing, at which time the inner diameter of said cylindrical end of the housing defines the effective area of the force thereafter applied to the piston by the fluid to complete the movement of the piston to its closed position.

6. The device according to claim 5, wherein said piston further includes a guiding disc having an outer diameter the same as the inner diameter of the housing for guiding the movement of the piston in the housing.

7. The device according to claim 6, wherein said guiding disc is fixed to the piston, on the side thereof opposite to said hollow stem, by a solid stem having an outer diameter smaller than that of the piston.

8. The device according to claim 7, wherein said spring is a coiled spring interposed between said guiding disc and an annular shoulder formed at the juncture between the inner face of the housing and the inner face of it cylindrical end.

9. The device according to claim 8, wherein said guiding disc, solid stem, piston, and hollow stem are formed as a single intergral unit.

10. The device according to claim 3, wherein said passageway in said hollow stem comprises a plurality of large openings around its periphery.

11. The device according to claim 1, wherein said container is located such that its end opposite to that connected to the valve assembly is at a higher elevation than said valve assembly.

12. A method of flushing out contaminants from a section of a line conveying a pressurized fluid, comprising:
   attaching a container to the end of the line section via a valve assembly which, when the line section is depressurized, connects the interior of the container to the interior of the line section, and when the line section is pressurized, disconnects the interior of the container from the end of the line section and connects the interior of the container to the atmosphere;
   and applying pressurized fluid to the line section first to cause the contaminants to be received within the container and the interior of the container to be pressurized, and then to disconnect the interior of the container from the line section and to connect it to the atmosphere, whereby the contents of the container are flushed out to the atmosphere.

13. The method according to claim 12, wherein the initial increase of pressure of the fluid in the line section applies an initial force to the valve assembly starting its movement to disconnect the interior of the container from the line section and to connect it to the atmosphere, and a further increase in the pressure of the fluid in the line section applies an increased force to the valve assembly completing its actuation to disconnect the interior of the container from the line section and to connect it to the atmosphere.

14. The method according to claim 12, wherein the line section is in a water supply line, the method flushing out solid contaminants accumulating in the line.

15. The method according to claim 12, wherein the line section is in an oil supply line, the method flushing out solid and liquid contaminants in the line.

16. The method according to claim 12, wherein the line section is in an air supply line, the method flushing out water accumulating in the line.

17. The method according to claim 12, wherein said container is attached to the end of a line to flush out the contaminants from the complete line.

18. The method according to claim 12, wherein said container is attached to an intermediate point in the line to flush out the contaminants from the line section immediately upstream of the point of attachment of the container to the line.

* * * * *